(12) United States Patent
de Cesare et al.

(10) Patent No.: US 8,667,198 B2
(45) Date of Patent: Mar. 4, 2014

(54) METHODS AND SYSTEMS FOR TIME KEEPING IN A DATA PROCESSING SYSTEM

(75) Inventors: Joshua de Cesare, Campbell, CA (US); Bernard Semeria, Palo Alto, CA (US); Michael Smith, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 277 days.

(21) Appl. No.: 11/620,705

(22) Filed: Jan. 7, 2007

(65) Prior Publication Data

US 2008/0168201 A1 Jul. 10, 2008

(51) Int. Cl.
*G06F 13/36* (2006.01)

(52) U.S. Cl.
USPC .......................................... 710/117; 710/269

(58) Field of Classification Search
USPC ............ 710/261, 264–266, 269, 45, 117, 124
See application file for complete search history.

(56) References Cited

U.S. PATENT DOCUMENTS

| | | | |
|---|---|---|---|
| 5,623,677 A | 4/1997 | Townsley et al. | |
| 5,768,599 A * | 6/1998 | Yokomizo | 710/260 |
| 6,002,436 A | 12/1999 | Anderson | |
| 6,016,548 A * | 1/2000 | Nakamura et al. | 713/323 |
| 6,115,776 A * | 9/2000 | Reid et al. | 710/260 |
| 6,360,327 B1 * | 3/2002 | Hobson | 713/300 |
| 6,434,708 B1 * | 8/2002 | Dunnihoo et al. | 713/502 |
| 6,473,607 B1 | 10/2002 | Shohara et al. | |
| 6,477,654 B1 | 11/2002 | Dean et al. | |
| 6,625,740 B1 | 9/2003 | Datar et al. | |
| 6,633,942 B1 * | 10/2003 | Balasubramanian | 710/264 |
| 6,795,781 B2 | 9/2004 | Aldridge et al. | |
| 6,816,750 B1 * | 11/2004 | Klaas | 700/121 |
| 7,039,819 B1 | 5/2006 | Kommrusch et al. | |
| 7,124,225 B2 * | 10/2006 | Yao | 710/266 |
| 7,165,134 B1 * | 1/2007 | Kardach | 710/264 |

(Continued)

FOREIGN PATENT DOCUMENTS

| | | |
|---|---|---|
| EP | 1 164 460 A1 | 12/2001 |
| EP | 1 282 030 A1 | 2/2003 |

(Continued)

OTHER PUBLICATIONS

Preemption (Computing) by Wikipedia, <http://en.wikipedia.org/wiki/Preemption_(computing)>, accessed on May 20, 2010.*

(Continued)

*Primary Examiner* — Khanh Dang
(74) *Attorney, Agent, or Firm* — Meyertons, Hood, Kivlin, Kowert & Goetzel, P.C.

(57) ABSTRACT

Data processing systems with interrupts and methods for operating such data processing systems and machine readable media for causing such methods and containing executable program instructions. In one embodiment, an exemplary data processing system includes a processing system, an interrupt controller coupled to the processing system and a timer circuit which is coupled to the interrupt controller. The interrupt controller is configured to provide a first interrupt signal and a second interrupt signal to the processing system. The processing system is configured to maintain a data structure (such as, e.g., a list) of time-related events for a plurality of processes, and the processing system is configured to cause the entry of a value, representing a period of time, into the timer circuit. The timer circuit is configured to cause an assertion of the first interrupt signal in response to an expiration of the time period.

24 Claims, 15 Drawing Sheets

(56) References Cited

U.S. PATENT DOCUMENTS

| | | |
|---|---|---|
| 7,256,788 B1 | 8/2007 | Luu et al. |
| 7,529,958 B2 | 5/2009 | Roth et al. |
| 7,558,978 B2 | 7/2009 | Ho |
| 7,633,076 B2 | 12/2009 | Huppi et al. |
| 8,145,928 B2 | 3/2012 | de Cesare et al. |
| 2002/0087225 A1 | 7/2002 | Howard |
| 2002/0099964 A1 | 7/2002 | Zdravkovic |
| 2002/0112193 A1 | 8/2002 | Altman et al. |
| 2002/0135398 A1 | 9/2002 | Choi et al. |
| 2003/0095096 A1 | 5/2003 | Robbin et al. |
| 2003/0105983 A1 | 6/2003 | Brakmo et al. |
| 2003/0126487 A1 | 7/2003 | Soerensen et al. |
| 2003/0131269 A1 | 7/2003 | Mizyuabu et al. |
| 2003/0153368 A1 | 8/2003 | Bussan et al. |
| 2003/0196129 A1 | 10/2003 | Lin |
| 2004/0148533 A1 | 7/2004 | Nicholas |
| 2004/0199695 A1 * | 10/2004 | Purdham et al. ............... 710/269 |
| 2004/0224638 A1 | 11/2004 | Fadell et al. |
| 2005/0062502 A1 | 3/2005 | Arakawa |
| 2005/0149769 A1 | 7/2005 | O'Connor et al. |
| 2005/0223249 A1 | 10/2005 | Samson |
| 2006/0031692 A1 | 2/2006 | Kato et al. |
| 2006/0075267 A1 | 4/2006 | Tokue |
| 2006/0156043 A1 | 7/2006 | Liu et al. |
| 2007/0005995 A1 | 1/2007 | Kardach et al. |
| 2007/0016810 A1 | 1/2007 | Ono |
| 2007/0043963 A1 | 2/2007 | Cheng et al. |
| 2007/0079161 A1 | 4/2007 | Gupta |
| 2007/0113113 A1 | 5/2007 | Sauer et al. |
| 2007/0162775 A1 | 7/2007 | Raghuvanshi |
| 2008/0002603 A1 | 1/2008 | Hutsell et al. |
| 2008/0016374 A1 | 1/2008 | Gee et al. |
| 2008/0016380 A1 | 1/2008 | Stufflebeam |
| 2008/0147946 A1 * | 6/2008 | Pesavento et al. ............ 710/265 |
| 2008/0307423 A1 | 12/2008 | Karlapalem |

FOREIGN PATENT DOCUMENTS

| | | |
|---|---|---|
| EP | 1 503 271 A2 | 2/2005 |
| EP | 1 645 940 A2 | 4/2006 |
| EP | 1 739 523 A2 | 1/2007 |
| JP | 2001 188628 A | 7/2001 |

OTHER PUBLICATIONS

ARM Limited, "ARM Architecture Reference Manual", 2005, pp. i through A2-70, Cambridge, England.

PCT International Search Report and Written Opinion of International Searching Authority, PCT/US2007/025848, Nov. 14, 2008, 23 pages.

Shin et al., Power Conscious Fixed Priority Scheduling for Hard Real-Time Systems, 1999, pp. 134-139.

* cited by examiner

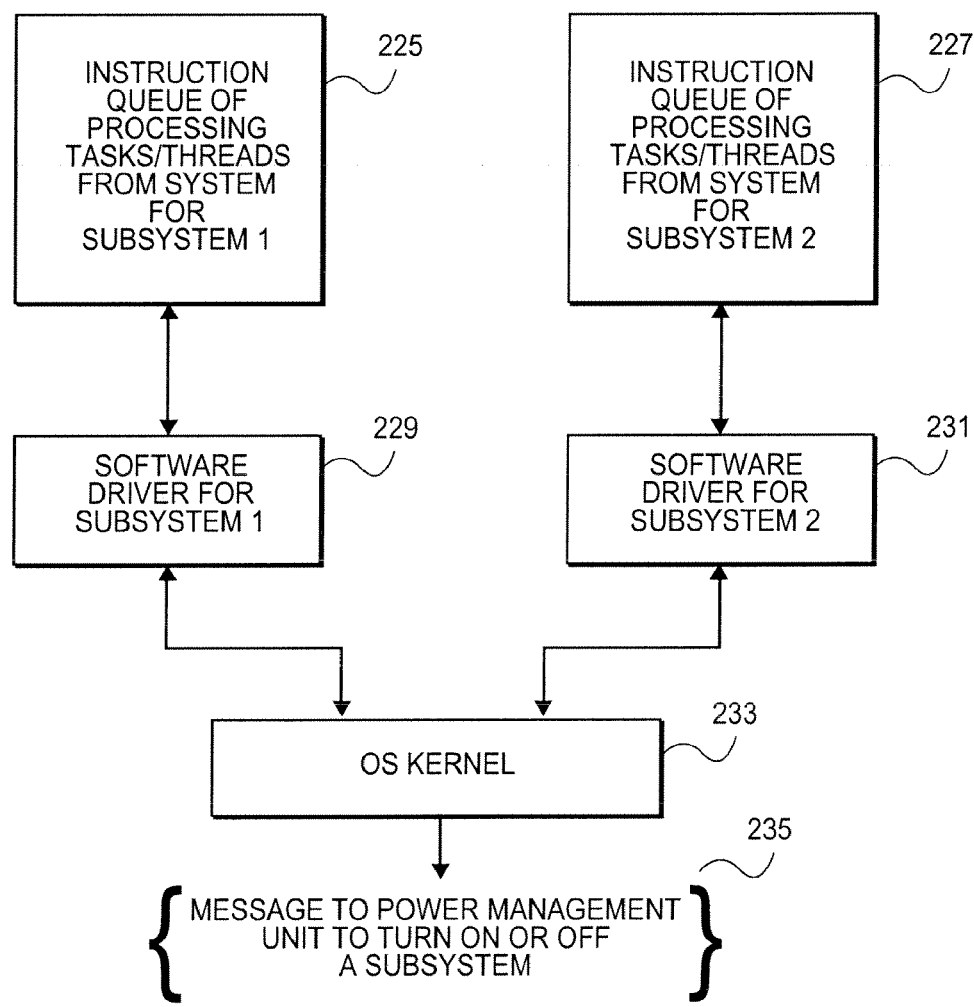

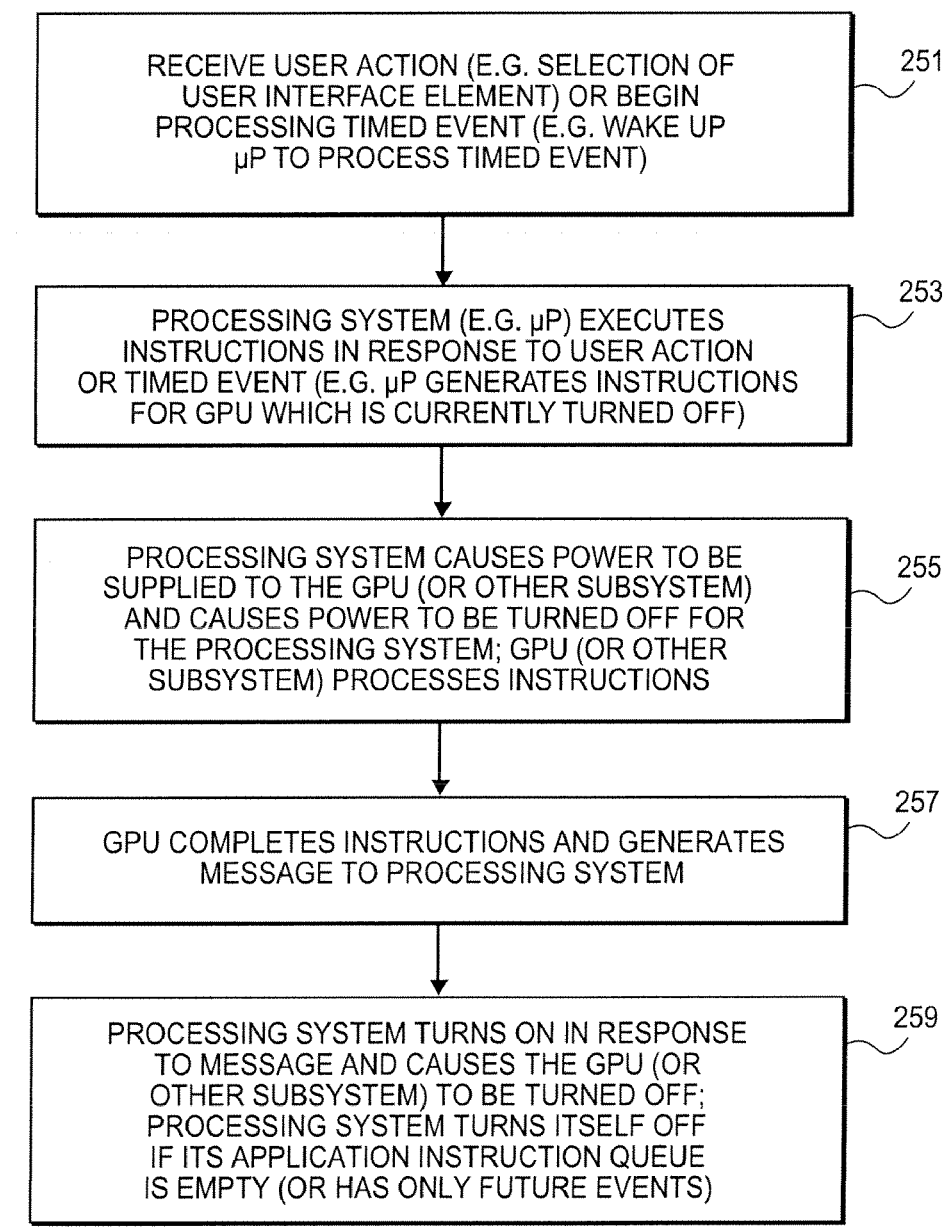

METHODS AND SYSTEMS FOR TIME KEEPING IN A DATA PROCESSING SYSTEM

BACKGROUND OF THE INVENTION

At least certain aspects of the inventions relate to data processing systems and the management of power consumption on those systems. Other aspects of the inventions described herein relate to methods and systems for time keeping in a data processing system.

Power management on a data processing system often involves techniques for reducing the consumption of power by components in the data processing system. The data processing system may be a laptop or otherwise portable computer, such as a handheld general purpose computer or a cellular telephone. The management of power consumption in a portable device which is powered by a battery is particularly important because better power management usually results in the ability to use the portable device for a longer period of time when it is powered by one or more batteries.

Conventional systems typically utilize timers to indicate when a subsystem should be turned off after a period of inactivity. For example, the motors in a hard drive storage system are typically turned off after a predetermined period of inactivity of the hard drive system. Similarly, the backlight or other light source of a display system may be turned off in response to user inactivity which exceeds a predetermined period of time. In both cases, the power management technique is based on the use of a timer which determines when the period of inactivity exceeds a selected duration.

Another technique which is used in the prior art for managing power consumption of data processing systems is shown in FIG. 1. In this technique, the data processing system is switched between at least two different operating points, such as the operating points 12 and 14 shown in the graph 10. Each operating point represents a particular operating voltage and frequency pair. Thus, for example, operating point 12 consumes less power by having the data processing system operate at a lower voltage and also at a lower operating frequency relative to the operating point 14. In the case of operating point 14, the data processing system operates at a higher voltage (V2) and a higher operating frequency (F2).

Certain systems provide the capability to switch power completely off (e.g. set the operating voltage at V=0) if no use is being made of a particular subsystem. For example, certain system on a chip (SOC) provide a power gating feature which allows for particular subsystems to be turned off completely if they are not being used. This approach does not take into account the status of an instruction queue relative to a system which may be turned off before events which are scheduled in the instruction queue.

SUMMARY OF THE DESCRIPTION

At least certain embodiments described herein relate to methods and systems for keeping time in a data processing system. In one embodiment described herein, a data processing system includes a processing system, such as a microprocessor, an interrupt controller which is coupled to the microprocessor to provide a first interrupt signal and a second interrupt signal to the processing system, and a timer circuit coupled to the interrupt controller. The first interrupt signal and the second interrupt signal may be different types of signals; for example, the first interrupt signal may be a fast interrupt signal while the second interrupt signal may be a normal interrupt signal. The processing system may be configured to maintain a data structure of time-related events, such as future events for a plurality of different processes, such as processes which use different subsystems in the data processing system or different software processes. The processing system may be further configured to cause the entry of a value, representing a period of time into the timer circuit, and the timer circuit may be configured to cause an assertion of the first interrupt signal in response to an expiration of the period of time. The processing system may be configured to cause the entry of the value in response to selecting a time-related event from the data structure. In at least certain embodiments described below, a fast interrupt signal is used to keep time for future events for a plurality of different hardware and/or software processes operating within the data processing system. For example, a video decoding process may include future events which are stored in the data structure and an MP3 decoding process may include future events which are also stored in the data structure, and these time-related events for the different processes are processed at the appropriate time using the fast interrupt signal to cause the processing system and/or other subsystems to provide processing services for the scheduled event.

The plurality of processes may include software processes for a corresponding plurality of hardware subsystems which may include any one of a data decoder, a digital signal processor, a processing system, a graphics processing unit, a display controller one or more wireless interface controllers, a camera interface controller, and a serial bus interface controller.

In at least certain embodiments, at least one of the hardware systems may be powered up from a reduced power state in response to the assertion of the first interrupt signal, which may be a fast interrupt signal.

In another embodiment, a data processing system includes a processing system, an interrupt controller coupled to the processing system to provide a first interrupt signal to the processing system and to provide a second interrupt signal to the processing system, wherein the first interrupt signal receives a higher priority service from the processing system than the second interrupt signal. The data processing system further includes a timer circuit coupled to the interrupt controller; the processing system is configured to maintain a data structure of time-related events for a plurality of processes of different subsystems of the data processing system, and the processing system is configured to cause the timing circuit to specify a time. The timing, circuit is further configured to cause an assertion of the first interrupt signal in response to the time, and the processing system is configured to cause the timing circuit to specify the time in response to selecting a time-related event from the data structure. The plurality of processes may include software processes for a corresponding plurality of hardware subsystems which comprise at least one of a data decoder, a digital signal processor the processing system, a graphics processing unit, a display controller, one or more wireless interface controllers, a camera interface controller, and a serial bus interface controller. At least one of the hardware systems may be powered up from a reduced power state in response to the assertion of the first interrupt signal.

In an embodiment of the inventions, a method includes selecting a time-related event from a data structure of time-related events for a plurality of processes of different subsystems, which may be different software subsystems and/or hardware subsystems, and setting a timing circuit to specify a time in response to the selecting, and asserting a first interrupt signal in response to the time occurring wherein the timing circuit causes the assertion of the first interrupt signal by an interrupt controller. The interrupt controller may also provide a second interrupt signal which receives a lower priority service from the processing system. The plurality of processes may comprise software processes for a plurality of corresponding hardware subsystems which may be one of a data decoder, a digital signal processor, a processing system, etc. Other methods and systems are described herein and computer readable medium for causing a data processing system to perform any one of these methods are also described herein.

BRIEF DESCRIPTION OF THE DRAWINGS

The present invention is illustrated by way of example and not limitation in the figures of the accompanying drawings in which like references indicate similar elements.

FIG. 5C shows a data structure and software for use with at least one embodiment of the present inventions.

FIG. 6 is a flow chart which illustrates one exemplary method of the present inventions.

DETAILED DESCRIPTION

Figure 1:
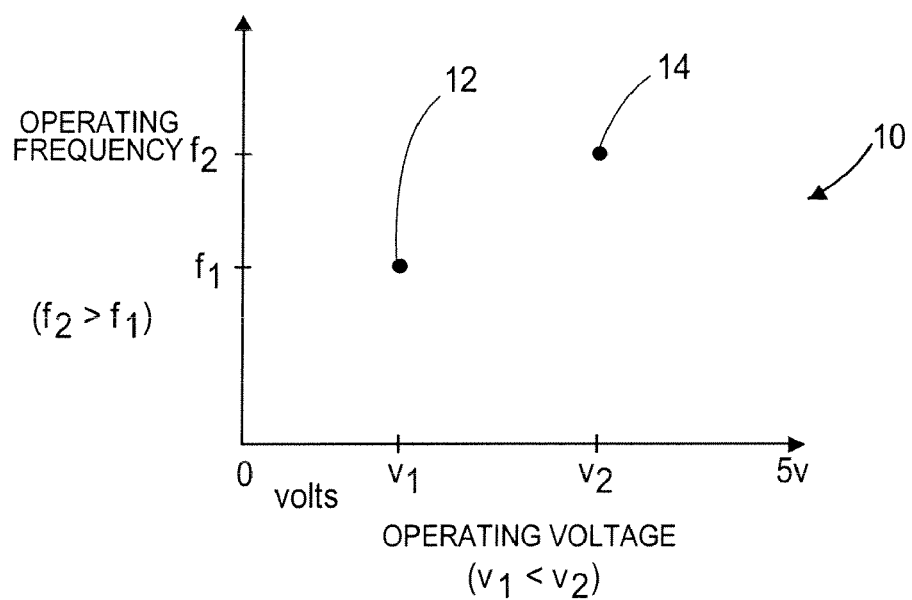
FIG. 1 shows an example in the prior art for reducing power consumption or otherwise managing the power in a data processing system.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a through understanding of various embodiments of the present invention. However, in certain instances, well-known or conventional details are not described in order to provide a concise discussion of embodiments of the present inventions.

The present invention can relate to an apparatus for performing one or more of the operations described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a bus.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple Computer, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. patent application numbers 2003/0095096 and 2004/0224638, both of which are incorporated herein by reference.

Embodiments of the inventions described herein may be part of other types of data processing systems, such as, for example, entertainment systems or personal digital assistants (PDAs), or general purpose computer systems, or special purpose computer systems, or an embedded device within another device, or cellular telephones which do not include media players, or devices which combine aspects or functions of these devices (e.g., a media player, such as an iPod®, combined with a PDA, an entertainment system, and a cellular telephone in one portable device), or devices or consumer electronic products which include a multi-touch input device such as a multi-touch handheld device or a cell phone with a multi-touch input device.

Figure 2:
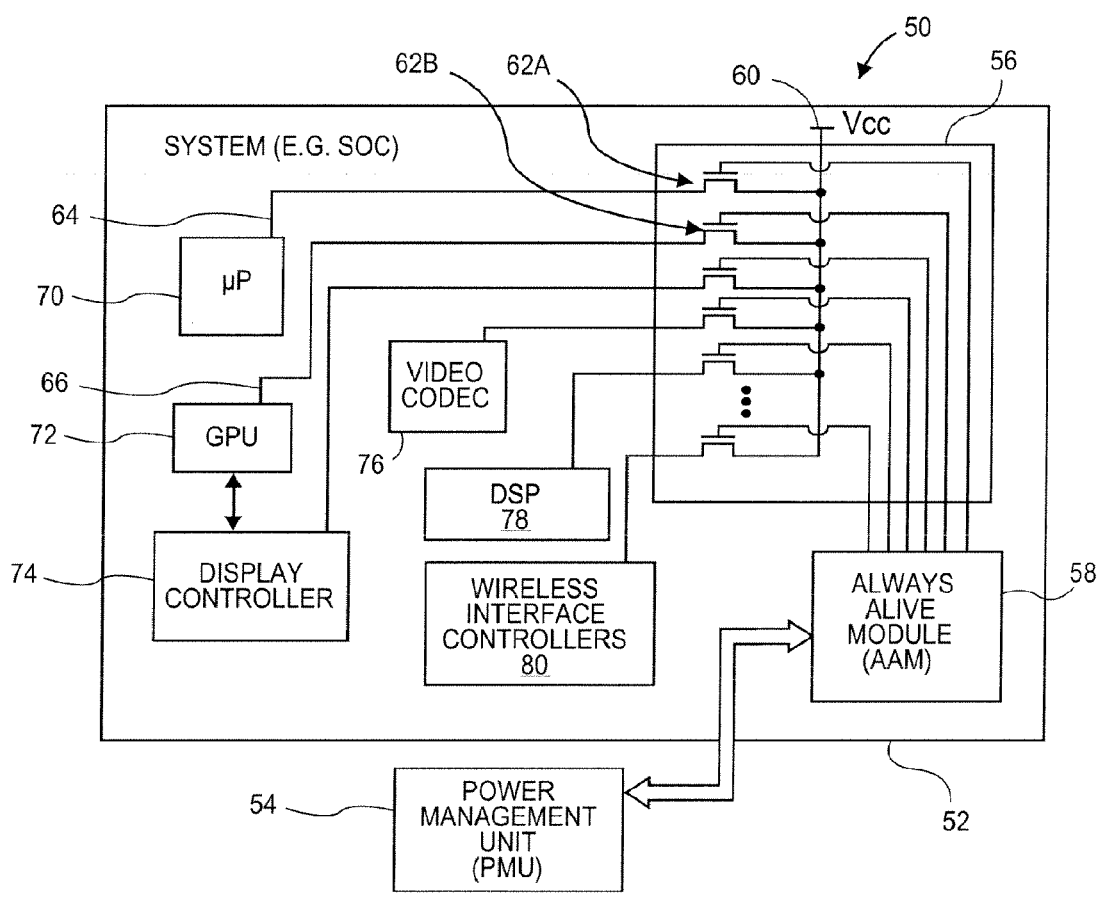
FIG. 2 shows, in block diagram form, an example of a system of the present invention which uses power gating to reduce power to one or more subsystems.

FIG. 2 shows an example of a data processing system which includes the ability to manage power consumed by one or more of the subsystems within the data processing system. The system 50 includes a power management unit 54 which is coupled through a data path to an always-alive module 58 which provides control signals to a power controller 56 which includes a plurality of power gates which provide power selectively to a plurality of different subsystems within the system 52, which may be a system on a chip component. The system 52 may include a microprocessor 70, a graphics processing unit (GPU) 72, a display controller 74, a video decoder 76, a digital signal processor (DSP) 78, and a wireless interface controllers 80 which may include one or more wireless interface controllers described further herein. Each of these subsystems 70, 72, 74, 76, 78, and 80 are coupled to a corresponding power gate through which power is supplied to the subsystem. It will be appreciated that multiple power gates may be provided in parallel to provide additional current capacity if need for a particular subsystem. Each power gate, such as power gate 62A or 62B, has its drain electrode coupled to a power supply voltage rail 60 and its source coupled to the corresponding subsystem. The gate electrode of each power gate is coupled to a control signal provided by the always-alive module 58 which may be controlled, in at least certain embodiments, by the power management unit 54 which may be coupled to the microprocessor through one or more buses as described herein. Through this arrangement, it is possible for the microprocessor to selectively cause the various different subsystems to be turned on and off by causing the power management unit 54 to provide control signals to the always-alive module 58 which in turn provides the appropriate control signals to turn on or off one or more of the subsystems. For example, the microprocessor 70 may instruct the power management unit 54 to turn off the GPU 72 by providing a control signal to the always-alive module 58 which in turn sets a voltage on the gate electrode of the power gate 62B which in turn shuts off the voltage supply to the GPU 72 through the power line 66. Similarly, one or more of the other subsystems may also be selectively turned off by causing its supply voltage to be dropped to a value well below that necessary to operate the subsystem. The microprocessor 70 may even turn itself off by saving state and context information for the various application programs and operating system programs which are executing at the time the microprocessor decides to turn power off for itself. It will be understood that the system 50 may have additional subsystems, not shown, such as memory controllers, etc. (examples of additional subsystems are shown in FIG. 4) or the system 50 may have fewer subsystems than shown in FIG. 2. It will also be understood that the system 50 may include one or more buses and one or more bus bridges which are used to interconnect the data and control signals between the various subsystems. The bus architecture shown in FIG. 3 is an example of one or more buses being used to couple the various components of a subsystem together.

Figure 3:
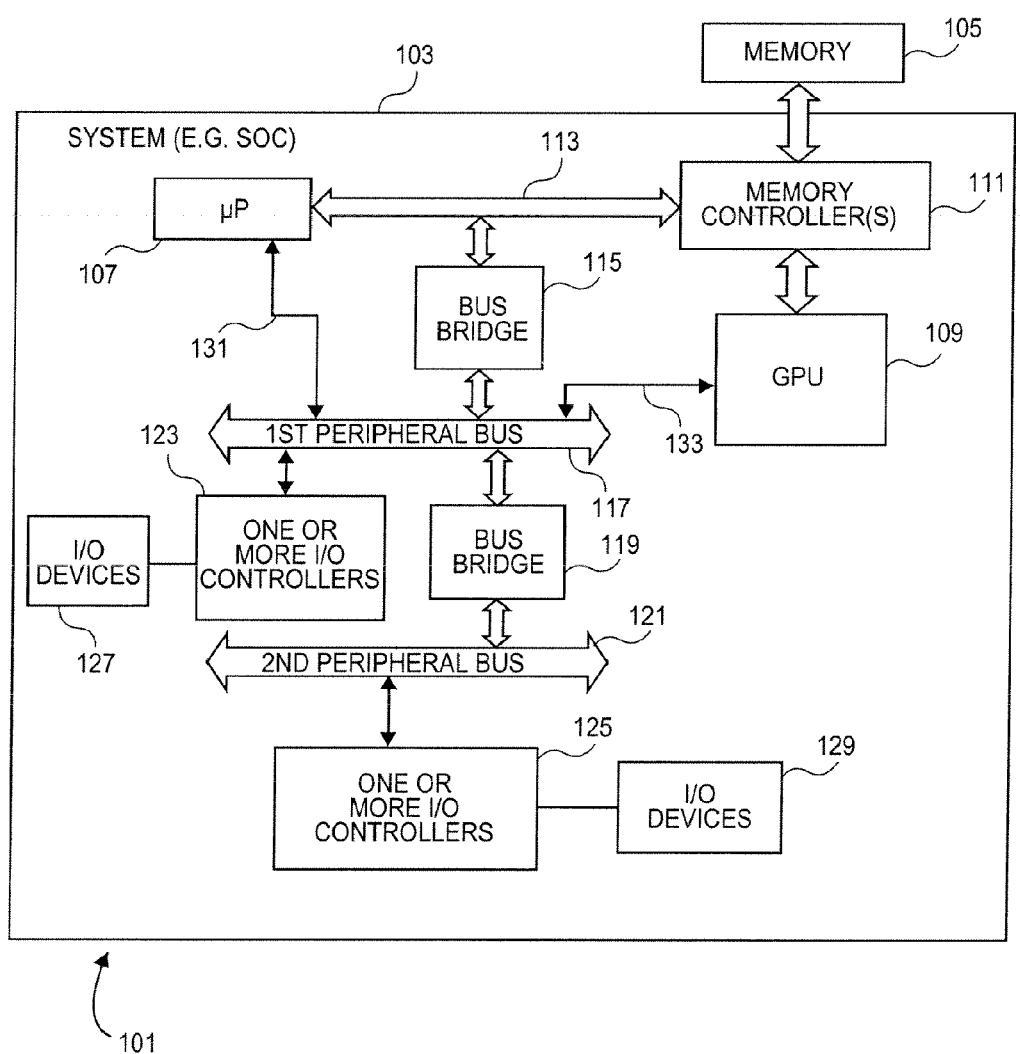
FIG. 3 shows, in block diagram form, an example of a data processing system which may employ one or more of the power management techniques described herein and which also may use one or more of the methods of keeping time described herein.
Figure 4:
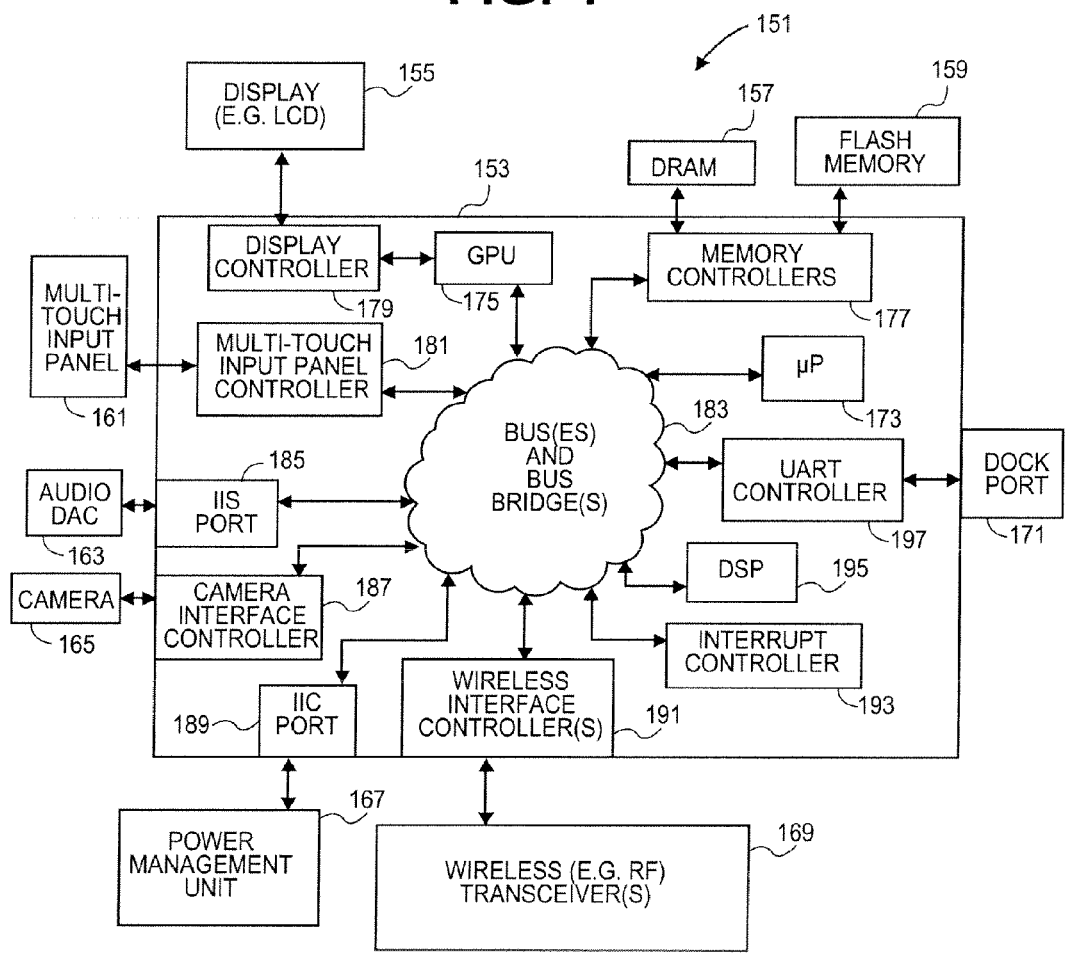
FIG. 4 shows another example of a data processing system which may use one or more of the power management techniques described herein and/or one or more of the time keeping techniques described herein.

FIG. 3 shows an example of one bus architecture which may be used in at least certain embodiments of the present inventions. This bus architecture may be used to couple together the subsystems in the system 50 of FIG. 2 and the subsystems in the system 151 of FIG. 4. The data processing system shown in FIG. 3 includes a memory 105 and a system 103 which may be implemented in at least one embodiment as a system on a chip, which is a monolithic semiconductor substrate which forms an integrated circuit that provides all the components for the system on a single chip. In an alternative embodiment, the various components may be spread over multiple integrated circuits. The system 103 includes a microprocessor 107 which is coupled to memory 105 through a bus 113 and a memory controller 111. The memory controller 111 may be multiple memory controllers for controlling different types of memory 105, such as DRAM (e.g. DDR RAM), and flash memory and/or other types or combinations of memory such as a magnetic hard drive, etc. The memory controller 111 is coupled to a graphics processing unit 109 which allows the GPU to obtain graphics data or store graphics data in the memory 105 and to retrieve graphics instructions, for processing by the GPU, from the memory 105. It will be understood that the GPU 109 is coupled to a display controller, such as the display controller 74 shown in FIG. 2, which in turn is coupled to a display to drive the display to cause images to appear on the display, such as a liquid crystal display (LCD). The microprocessor 107, the memory controller 111, the memory 105, and the GPU 109 are coupled to the rest of the subsystems of FIG. 3 through two peripheral buses and two bus bridges as shown in FIG. 3. Bus bridge 115 couples the bus 113 to the first peripheral bus 117, and bus bridge 119 couples the first peripheral bus 117 to the second peripheral bus 121. The microprocessor 107 and the GPU 109 are coupled to the peripheral buses 117 and 121 through these bus bridges. The GPU 109 is also coupled to the first peripheral bus 117 through a control port for graphics 133 to the first peripheral bus 117 and the microprocessor 107 is also coupled to the first peripheral bus 117 through a peripheral port 131 of the microprocessor 107. One or more input/output (I/O) devices may be part of the system 101. These I/O devices may be one or more of a plurality of known I/O devices including track pads, touch pads, multi-touch input panels, an audio speaker and an audio microphone, a camera, a dock port, one or more wireless interface controllers, a cursor control device such as a mouse or a joystick or a trackball, one or more keyboards, one or more network interface adapters (e.g. an Ethernet interface port), etc. If the system 103 is implemented as a system on a chip, then the I/O devices 127 and 129 would typically be a separate component which is not disposed on the integrated circuit. Each of the I/O devices 127 and 129 are coupled through I/O controllers, such as the I/O controllers 123 and the I/O controllers 125 as shown in FIG. 3. In addition to the I/O devices previously listed, the system 103 may include other subsystems which may be considered an I/O device, such as a video decoder or a digital signal processor such as the video decoder 76 and the DSP 78 as shown in FIG. 2. An embodiment of the system shown in FIG. 3 may include a power controller and a power management unit, along with an always-alive module in order to provide power gating to the various subsystems in the system 103. For example, a power management unit, which may be similar to the power management unit 54, may be coupled to an always-alive module, which may be similar to the always-alive module 58, which in turn is coupled to provide control signals to a power controller, such as the power controller 56, in order to turn power on and off for one or more of the subsystems in the system 103, such as one or more of the I/O controllers or one or more of the I/O devices of FIG. 3 or the GPU 109 or the microprocessor 107, etc.

FIG. 4 shows another example of a system which may be used with one or more of the inventions described herein. For example, the system shown in FIG. 4 may operate in the manner shown in FIGS. 5A, 5B, and 6 and/or may operate in the manner shown in FIG. 11 and/or may operate in the manner shown in FIG. 13. The data processing system 151 may implement the system 153 as a system on a chip (SOC)

integrated circuit or may implement the system 153 as multiple integrated circuits coupled by one or more buses. The data processing system 151 includes a plurality of components which are shown external to the system 153 but which are coupled to the system 153 as shown in FIG. 4. Such components include the dynamic random access memory (DRAM) 157, the flash memory 159, both of which are coupled to the memory controllers 177, the dock port 171 which is coupled to a UART controller 197, the wireless (RF) transceivers 169 which are coupled to the wireless interface controllers 191, the power management unit 167 which is coupled to the IIC port 189, the camera 165 which is coupled to the camera interface controller 187, the audio digital-to-analog converter 163 which is coupled to the IIS port 185, the multi-touch input panel 161 which is coupled to the multi-touch input panel controller 181, and the display device 155 which may be a liquid crystal display device, which is coupled to the display controller 179. These various components provide input and output capabilities for the data processing system as is known in the art. In addition, the system 153 includes a graphics processing unit 175 and a microprocessor 173 which may be, in certain embodiments, an ARM microprocessor. In addition, the system may include a digital signal processor 195 and an interrupt controller 193. These various components are coupled together by one or more buses and bus bridges 183 which may be implemented in a variety of architectures, such as the bis architecture shown in FIG. 3 or alternative bus architectures. The power management unit 167 may operate in the same manner as the power management unit 54 of FIG. 2, thereby providing power reduction capabilities to one or more subsystems by turning power on or off selectively for one or more subsystems as described herein. The power management unit 167 may be coupled to an always-alive module (e.g., similar to always-alive module 58) and a power controller (e.g., similar to power controller 56) in the system of FIG. 4. Further, the power management unit 167, in conjunction with the microprocessor 173, may implement other power reduction techniques, such as operating at different voltage and frequency operating points as described herein. While the power management unit is shown external to the system 153, it may be part of a system on a chip implementation in certain embodiments. At least some of the other components, such as the wireless transceivers 169, may also be implemented in certain embodiments as part of a system on a chip. The wireless transceivers 169 may include infrared transceivers as well as radio frequency (RF) transceivers and may include one or more of such transceivers, such as a wireless cellular telephone transceiver, a WiFi compliant transceiver a WiMax compliant transceiver, a Bluetooth compliant transceiver, and other types of wireless transceivers. In one particular embodiment, the wireless transceivers 169 may include a wireless cellular telephone transceiver, a WiFi compliant transceiver (IEEE 802.11 A/G transceiver), and a Bluetooth transceiver. Each of these wireless transceivers may be coupled to a respective wireless interface controller which may be one or more of a plurality of interface controllers, such as a UART controller or an IIS controller or an SDIO controller, etc. The data processing system 151 may include further input/output devices, such as a keypad or a keyboard, or a cursor control device, or additional output devices, etc.

It will be understood that the data processing system of FIG. 4 may be implemented in a variety of different form factors or enclosures which package and embody the data processing system. For example, the data processing system 151 may be implemented as a desktop computer, a laptop computer, or an embedded system, consumer product or a handheld computer or other handheld device. It may be implemented to operate off of AC power or a combination of AC power and battery power or merely battery power in at least certain modes. The data processing system may include a cellular telephone and may have the form factor of a cellular telephone, such as a candy-bar style cellular telephone or a flip phone or a phone with a sliding keyboard which slides out (e.g., from an enclosure) or swings out (e.g., from an enclosure) to expose the keys of the keyboard. In certain embodiments, the data processing system 151 may be implemented in a tablet format of a small handheld computer which includes wireless cellular telephony and WiFi and Bluetooth wireless capability. Examples of such form factors are shown in co-pending U.S. patent application Ser. No. 11/586,862, filed Oct. 24, 2006, which is entitled "Automated Response To And Sensing Of User Activity In Portable Devices" and which is owned by the assignee of the instant inventions. This application is hereby incorporated herein by reference.

Figure 5A:
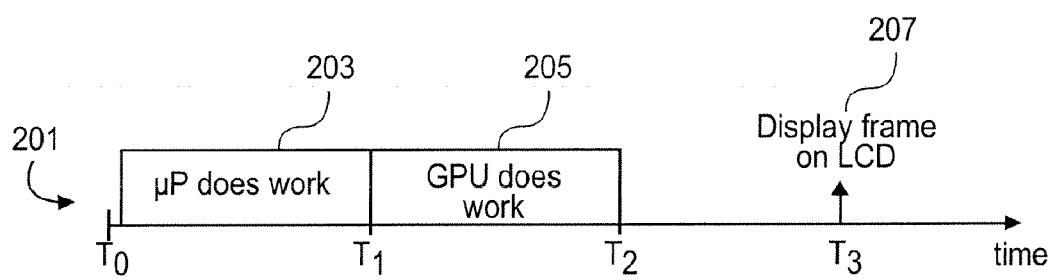
FIG. 5A shows a time line of activity in a data processing system according to one embodiment of the present invention.
Figure 5B:
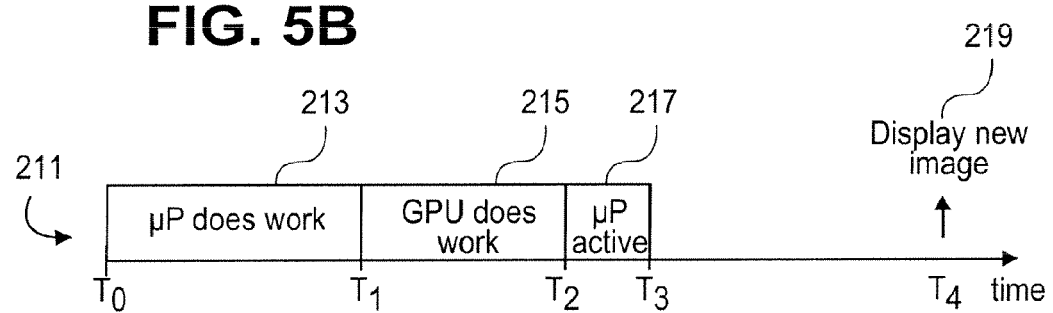
FIG. 5B shows a time line of activity of different subsystems of a data processing system according to one embodiment of the present invention.

FIGS. 5A and 5B provide two examples of a method in which power gating of a system, such as that shown in FIG. 2, 3 or 4, may be used in order to manage power consumption in such systems. The time line 201 of FIG. 5A shows the switching on and off of a microprocessor and GPU, such as the microprocessor 173 and the GPU 175 over time in a process in which the microprocessor reacts to an event (e.g. a user manipulation of an input device or a timed event which had been scheduled previously), and that reaction by the microprocessor causes an updating of a displayed image on a display device, such as the display 155, wherein the updating is completed by the GPU. During the time period 203, which is shown between times T0 and T1, the microprocessor operates on data to perform or create instructions in response to the event. These instructions may include instructions to the GPU to composite a collection of views or images into a final complete image, and the microprocessor may render one or more portions of those views. In doing so, the microprocessor may store the instructions for the GPU and the graphics data (e.g. the portions of the images to be composited in a final display) into a memory which is accessible by the GPU, such as the memory 157 and/or the flash memory 159 shown in FIG. 4. After the microprocessor completes its operations within the time frame 203, it begins to enter a power down state by saving its context and states and other data, into memory (e.g. DRAM 157 and or flash memory 159), and then causes power to be shut off to itself at time T1. At or before time T1, the GPU is returned to its power state from a reduced power state and operates on the instructions and data stored in the memory, such as memory 157 and/or flash memory 159, during the time period 205. In one embodiment, the microprocessor and the GPU are switched between zero volts and an operating voltage when switched from the power off state to the power on state. Hence, at time T0, the microprocessor in this embodiment would not receive power (its operating voltage is at zero volts) and during time period 203, it receives the full operating voltage. In this same embodiment, the GPU receives zero operating voltage during time period 203 and receives the full operating voltage of the GPU during the time period 205. Following the operation T2, both the microprocessor and the GPU may be turned off (e.g. have their operating voltages set at zero volts) as shown in FIG. 5A. Then at time T3, the next image is displayed at 207 shown in FIG. 5A. This may occur by reading data from a frame buffer written to by the GPU during the time period 205; for example, a display controller, such as the display controller 179, may read the next frame data from a frame buffer and cause that data to be displayed on a display device, such as the display 155. Hence, in the example of the time line shown in FIG. 5A, both the microprocessor and the GPU are turned off during a display at time T3 of the image initiated by the processing of the microprocessor during time period 203 and completed by the processing of the GPU during the time period 205.

FIG. 5B shows another time line 211 which provides another example of how power gating may be used to turn on and off various subsystems in a data processing system, such as the system shown in FIG. 2, 3, or 4. The microprocessor is shown being turned on during time periods 213 and 217; it is otherwise turned off during the time shown on time line 211. Hence, the microprocessor is turned on between times T0 and T1 and times T2 and T3 and is otherwise turned off (e.g. its operating voltage is set to zero volts). During the period of time that the microprocessor is turned on (time periods 213 and 217), it may be operating at full operating voltage. The GPU is shown as being turned on only during time period 215, which extends from times T1 to T2 in the time line 211. The microprocessor and the GPU may be performing operations which are similar to those described relative to FIG. 5A. For example, the microprocessor may be reacting to a user event or a timed event and may be preparing data and instructions which will be further processed by the GPU in order to render a final image which is displayed at time T4 (time 219 in the time line 211). The microprocessor is also shown as active during time period 217 in which the microprocessor is turned on by the GPU (e.g. by the method shown in operation 257 in FIG. 6) in order to turn off the GPU and to then turn off itself. An example of a method which operates in a manner shown in the time line of FIG. 5B is given in the flow chart of FIG. 6 which is described herein. In at least certain implementations, the microprocessor, during time period 217, may also instruct the display controller to display the new image at time T4, which may be the next refresh opportunity for the display controller to refresh the display by reading data out of the frame buffer for the display. In at least certain embodiments, the frame buffer may be implemented as a portion of the DRAM memory 157.

In at least certain embodiments, the entire time along either time lines 201 or 211 may be less than one second or even less than 100 milliseconds, such as less than 10 ms. Hence, the microprocessor and the GPU are being turned on and off over a relatively short period of time directly in response to the existence or nonexistence of user tasks or threads for each subsystem, such as the microprocessor or the GPU. In certain implementations, the power management shown in FIGS. 5A and 5B may be implemented through entirely software control or driven through software without the use of timers, and based on the state of an instruction queue of user tasks or threads as shown in FIG. 5C. In at least certain embodiments, the GPU may be turned off (e.g. have its operating voltage set to zero volts) between display frames, such as successive refresh display operations on a display device, such as the display 155.

FIG. 5C shows an example of how software may drive the power management technique shown in FIGS. 5A and 5B. A data structure 225 and a data structure 227 may be stored in memory, such as the memory 157 and/or flash memory 159, and these data structures include an instruction queue of processing tasks/threads from the system for a particular subsystem. In the case of the data structure 225, the instruction queue is for subsystem 1, and in the case of data structure 227, the instruction queue is for subsystem 2. In at least certain embodiments, these two subsystems may be any one of the subsystems shown in FIG. 2, 3, or 4, such as the GPU 175 and another subsystem, such as the microprocessor 173 or a data decoder, such as the video codec 76. A software driver will typically exist for each subsystem, such as the software driver 229 for subsystem 1 and the software driver 231 for the subsystem 2. These drivers interact with their corresponding data structure to process the user tasks/threads for their respective subsystems. These software drivers also interact with an operating system kernel 233 which can, in at least certain embodiments, cause messages (e.g. an interrupt signal) to be sent to a power management unit to turn on and turn off the subsystem. Examples of subsystems being turned on and off are shown in FIGS. 5A and 5B and are also further illustrated in FIG. 6. In the architecture of FIG. 5C, the instruction queue itself provides a trigger mechanism to automatically cause a subsystem to be turned off when there are no further user tasks/threads for a particular subsystem or all user tasks/threads or other tasks/threads are for future events that have been scheduled. Hence, the state of the instruction queue may initiate a turn off operation of a subsystem when there are either no instructions from the system or only instructions for future events/actions. The software driver for a particular subsystem may determine the "empty" state of the instruction queue for user tasks/threads and may inform the operating system kernel of this state through a call or other mechanism such as an interrupt signal. In turn, the operating system kernel 233 can cause a message to be sent to the power management unit or other device to cause a power controller, such as the power controller 56, to turn off power to the subsystem which indicated that its instruction queue was "empty." It will be appreciated that at least in certain implementations, each subsystem will take the necessary steps to preserve its state and context before having its power turned off; this may be performed by the driver software for the particular subsystem in conjunction with the operating system before signaling the operating system to turn off the particular subsystem. In alternative embodiments, the power management techniques may utilize an approach other than power gating to manage power, such as the use of different voltage/frequency operating points rather than turning power completely off and completely on.

FIG. 6 shows an example of one method according to at least one embodiment of the present inventions. The method of FIG. 6 may represent the processing operations which occur in the time line 211 of FIG. 5B. The data processing system, in operation 251, receives a user action, such as the selection of a user interface element on a display device, or begins processing of a timed event, such as the microprocessor wakes up as described herein to process a timed event. The waking up operation typically involves the microprocessor (or other component) exiting a reduced power consumption state and entering a higher power consumption state. In operation 253, the processing system, such as a microprocessor, executes instructions in response to the user action or timed event from operation 251. For example, the microprocessor may generate instructions and data for processing by the GPU which is currently turned off. Operation 253 may represent the processing during time period 23 of FIG. 5B. Then in operation 255, the processing system causes power to be supplied to the GPU (or other subsystem) and causes power to be turned off for the processing system. This portion of operation 255 occurs around the time T1 shown in FIG. 5B. The remainder of operation 255 involves the GPU processing the instructions prepared for it by the microprocessor during time period 213. This portion of operation 255 corresponds to time period 215 in FIG. 5B. Then in operation 257, the GPU completes the instructions and generates a message to the operating system or processing system. The GPU will typically cause the storage of the next display image to be used when refreshing the display into the frame buffer, which is under control of the display controller 179, for example. This allows the display controller to refresh the display with the new image without requiring that the GPU be turned on. Then in operation 259, the processing system turns on in response to the message from operation 257, which may be an interrupt signal, and causes the GPU, or other subsystem, to be turned off, and then the processing system turns itself off if its application instruction queue is empty or has only future events. The method of FIG. 6 refers to the microprocessor and the GPU as the two subsystems involved in this method; however, in alternative embodiments, different subsystems may be involved, such as the microprocessor and a data decoder (e.g. an MPEG data decoder subsystem) or the wireless interface controllers and the wireless transceivers and the microprocessor, or other combinations of subsystems, such as the subsystems shown in FIG. 2, 3 and/or 4. In at least certain embodiments, the pattern of operations shown in FIG. 5B and reflected in FIG. 6 may be repeated several times (e.g. three or more times) over a short period of time, such as a few seconds (e.g. less than 10 seconds). Hence, during a short period of time, both the microprocessor and the GPU may be repeatedly (e.g. three or more times) turned on (e.g. full operating voltage) and repeatedly (e.g. three or more times) turned off (e.g. zero operating voltage) over such a short time period. As noted elsewhere herein, each subsystem may implement a state-saving process which involves saving states and context and other data associated with the subsystem before being powered off as is known in the art. In alternative embodiments, it will be appreciated that, rather than using completely off and completely on as the two states by which power is managed, the data processing system may employ alternative techniques alone or in combination with power gating to achieve power management. For example, the data processing system may use different operating points as in FIG. 1 in conjunction with power gating, or without power gating to manage power consumption of the data processing system.

Figure 7:
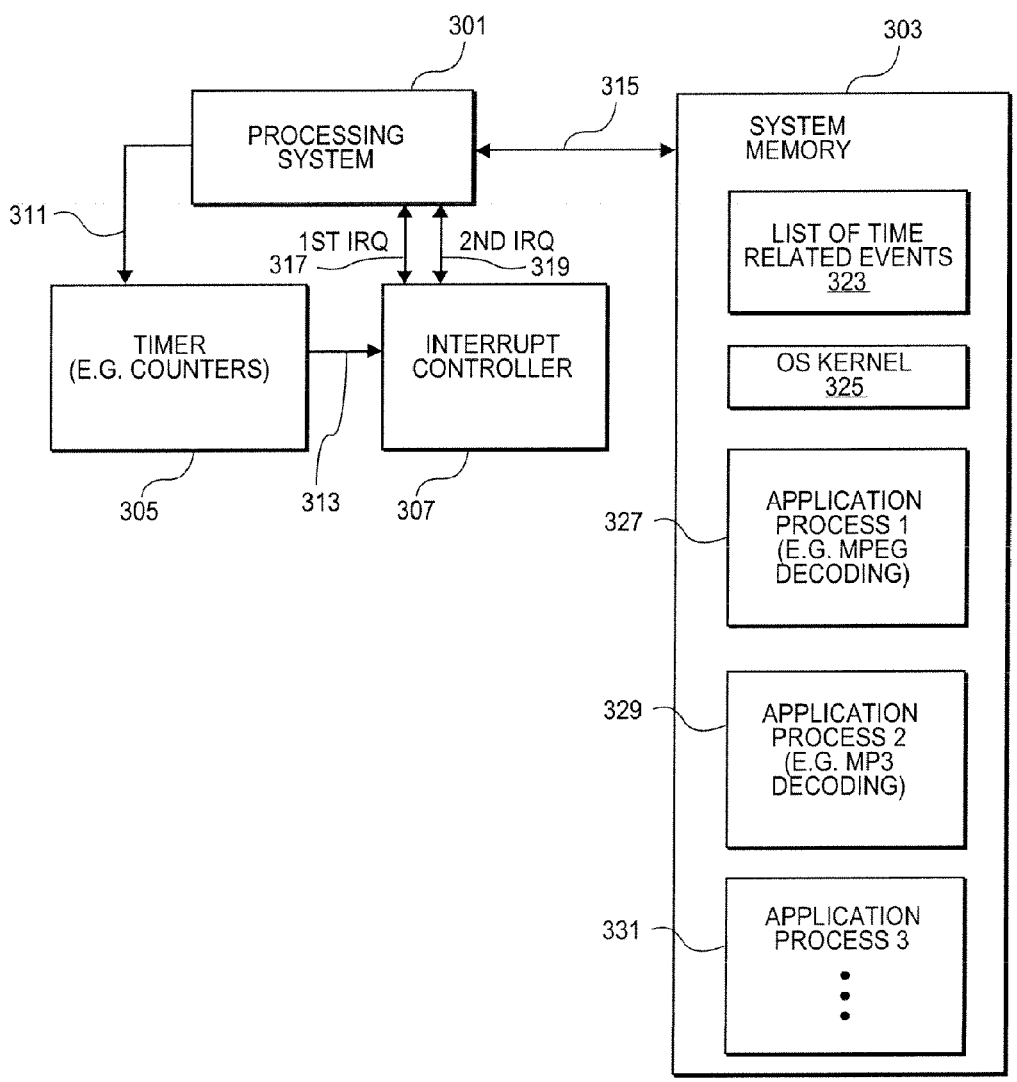
FIG. 7 shows an example of a data processing system which utilizes two different types of interrupts in order to keep time according to one embodiment of the present inventions.

Another aspect of the present inventions will now be described with reference to FIGS. 7, 8, 9, 10, 11, and 12. It will be appreciated that this aspect may be used in combination with other aspects described herein or may be used by itself in at least certain embodiments of the inventions. FIG. 7 shows a data processing system which includes a processing system 301 coupled to system memory 303 by a bus 315. In addition, the system of FIG. 7 includes an interrupt controller 307 which is coupled to the processing system 301 through at least two interrupt signal data paths 317 and 319. In at least one embodiment, the processing system may be the microprocessor 173 and the system memory 303 may be one or both of memory 157 and flash memory 159, and the interrupt controller 307 may be the interrupt controller 193. The system of FIG. 7 also includes a timer 305 which includes one or more counters which are capable of asserting a timeout or other similar signal over data path 313D, and these timeout assertion signals can in turn cause the interrupt controller 307 to generate either a first interrupt signal over the data path 317 or a second interrupt signal over the data path 319. The data path 311 allows the processing system 301 to store a count value or timer value or other time-related value into the timer 305. The interrupt controller 307 may be a conventional interrupt controller that provides two different types of interrupt signals, such as a fast interrupt signal and a normal interrupt signal in the case of microprocessors from ARM Ltd. of Cambridge, England. The first interrupt signal 317 may be the fast interrupt signal which typically will provide a higher priority of service to the source of the interrupt than the other type of interrupt signal. One reason for this difference in performance includes the way in which registers are reserved in a microprocessor relative to the mode of the microprocessor as described below relative to FIG. 10. Prior systems which utilized fast interrupt signals in an ARM architecture used the fast interrupt signal solely for a particular process or subsystem which had sole control and use of the fast interrupt signal. In other words, the fast interrupt signal was dedicated for use for a particular process or subsystem, which is typically the process or subsystem that the designer wants to make sure has a high priority in receiving service. This is unlike embodiments of the inventions in which different processes and/or different subsystems, such as different software processes operating on different hardware subsystems, can each use the fast interrupt signal in order to keep time for time-related events for each of those different processes and/or subsystems as described herein. For example, the memory 303 shows at least three different application processes which may be executing on the data processing system of FIG. 7 at any one point in time. Application process 327 may be, for example, an MPEG decoding operation being performed partly in software by the processing system 301 and partly by an MPEG decoding hardware subsystem such as the subsystem 76 shown in FIG. 2. The application process 329 may, for example, be an MP3 decoding operation which is performed in part by the processing system 301 and in part by a separate hardware subsystem such as another data decoder which is dedicated to audio data, etc. Application process 331 may be another software process being performed in part by the processing system and performed in part by yet another subsystem (e.g. the DSP 195 of FIG. 4). Hence, the state of the memory 303 shows that multiple applications may be executing concurrently and multiple subsystems may be operating concurrently, with the OS kernel 325, which is an executing operating system software, overseeing the management of various tasks and processes in a conventional manner. In one exemplary embodiment, one subsystem may be the processing system itself (the microprocessor 175) and the other subsystem currently in operation may be an MPEG decoding subsystem or the GPU. In any event, at least certain embodiments of the inventions allow different processes for different subsystems to either concurrently or sequentially utilize a fast interrupt signal to respond to a time-related event in order to keep time for those subsystems. The processing system 301, in conjunction with the OS kernel 325, typically maintains a data structure, such as a list of time-related events, such as the list 323 shown stored in the memory 303. This list may be an ordered list from almost now to a future time and the processing system may use this list to service events that were scheduled for operation in the future at the time they were scheduled, such that they may be performed at the time scheduled and requested by the particular subsystem or process.

Figure 9:
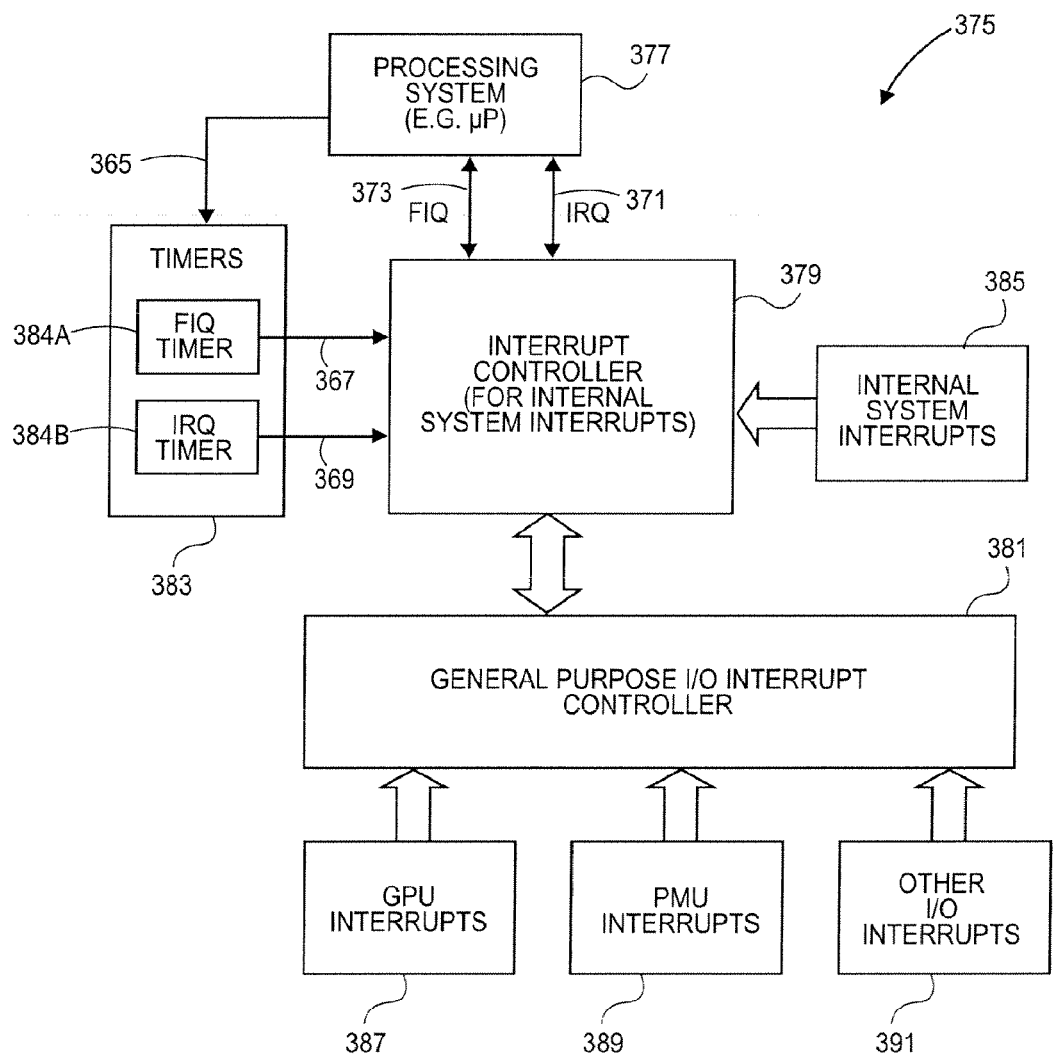
FIG. 9 shows another example of a data processing system which utilizes two different types of interrupt signals in order to keep time in a data processing system according to one embodiment of the present inventions.
Figure 11:
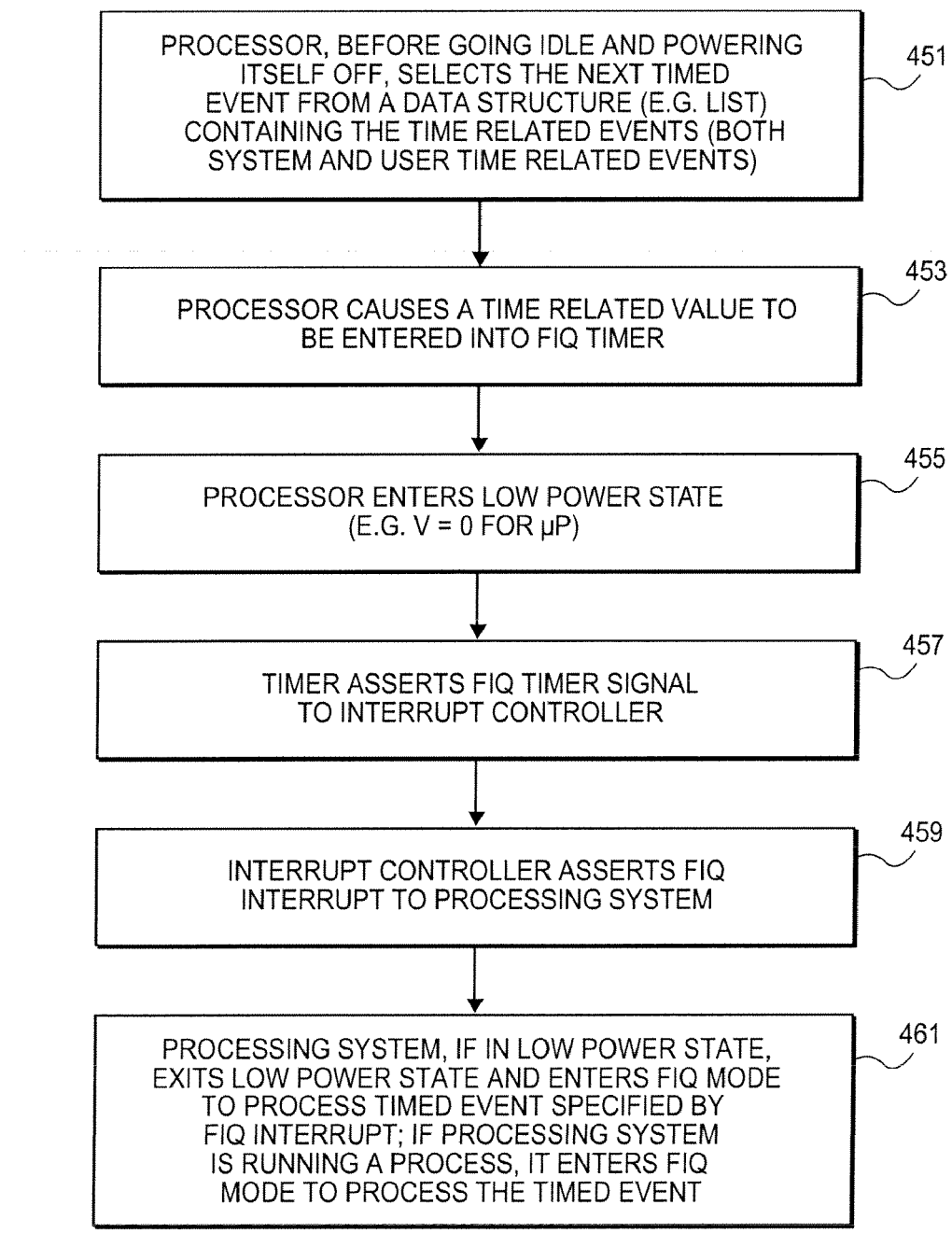
FIG. 11 is a flow chart which illustrates one embodiment of the present inventions relating to the use of a type of interrupt signal to schedule time-related events, such as time-related events in the future.

FIG. 11 shows an example of a method in which the system of FIG. 7 operates by using a fast interrupt signal to provide time for time-related events of different processes and/or different subsystems within the data processing system. In operation 451, the processor, such as processing system 301, before going idle and powering itself off, selects the next timed event from a data structure containing time-related events of different processes and, or different subsystems. These events may be both system and user time-related events. The list 323 in memory 303 is an example of such a data structure. Then in operation 453, the processor causes a time-related value to be entered into the timer associated with the fast interrupt signal. The fast interrupt timer 384A shown in FIG. 9 is an example of such a timer. Then in operation 455, the processor enters a low power state, such as a zero voltage operating state, for the microprocessor. While the processor is off, the timer which received the time-related value in operation 453, continues to count until it reaches the value indicating that the associated time-related value has reached its scheduled time and needs to be performed. The timer, such as timer 305, as a result of reaching the value, asserts a fast interrupt timer signal to the interrupt controller in operation 457. In the examples shown in FIGS. 7 and 9, a fast interrupt timing signal is asserted on data path 313 in FIG. 7 while the fast interrupt timer signal is asserted on data path 367 in FIG. 9. The assertion of this timer signal is interpreted by the interrupt controller to mean that the fast interrupt signal must be asserted, and hence in operation 459, the interrupt controller, such as interrupt controller 307 or interrupt controller 379, asserts the fast interrupt signal to the processing system, such as the processing system 301. The processing system responds as shown in operation 461, and its response depends upon its states and whether or not interrupts are enabled. The operations shown within operation 461 assume that interrupts are enabled; if they are not, the method of FIG. 12 may be used when interrupts are not enabled. If the processing system, such as processing system 301, is in a low power state when the fast interrupt signal is asserted in operation 459, then the processing system exits its low power state and enters its fast interrupt mode to process the time event specified by the fast interrupt, which may be for any one of the different application processes such as the processes 327 or 329 or 331 or for other processes or subsystems which have their time-related events stored in a data structure, such as the list 323 in the memory 303 of FIG. 7. The processing of the timed event in fast interrupt mode may occur in the same manner to the processing in the prior art of fast interrupts, which are dedicated to a particular subsystem, in that the processing system will call the handler for the hardware and will clear the fast interrupt status signal in the interrupt controller and will perform other operations in order to service the fast interrupt, which in turn ultimately leads to the servicing of the scheduled event which resulted in the assertion of the fast interrupt signal. If the processing system is running a process, such as application process 3 stored in memory 303, then it will enter fast interrupt mode to process the timed event which caused the assertion of the fast interrupt. For example, if the user is providing an input to the system and the system is responding to that input, the response to that input will be interrupted by the fast interrupt signal in operation 461 which will cause the system to service the time-related event which caused the assertion of the fast interrupt signal in the method of FIG. 11 and then the system will return to processing of the user's input. Again, the response to this fast interrupt signal may be performed as in the prior art systems in which the use of fast interrupt signals was dedicated to a particular process or subsystem.

It will be understood that the next timed event which was selected in operation 451 may be for any one of the executing processes, such as processes 327 or 329 or 331 or other processes and/or different subsystems. In other words, the use of the fast interrupt signal is not dedicated to any one particular process or subsystem but rather is used to provide a time keeping mechanism for many different processes and/or subsystems.

FIG. 9 shows a more detailed example of the timers and the interrupt controller and how the interrupt controller is coupled to receive interrupts from different sources. The processing system 377 corresponds to the processing system 301 and the timer 383 corresponds to the timer 305. The interrupt controller 379 corresponds to interrupt controller 307. The system memory shown in FIG. 7 (system memory 303) is not shown in FIG. 9 in order to simplify FIG. 9; however, it will be understood that the processing system 377 is coupled to a system memory, such as the system memory 303 which includes a plurality of different executing tasks or threads for one or more subsystems in the overall data processing system, such as the system shown in FIG. 4. The fast interrupt signal 373 corresponds to the first interrupt signal on data path 317 and the normal interrupt signal 371 corresponds to the second interrupt signal provided on data path 319 of FIG. 7. Data path 365 allows the data processing system 377 to store time-related values, such as a counter value, which may be decremented or incremented in order to determine the expiration of a time period or the occurrence of a time. The timer 383 includes at least two timers, one of which is utilized to assert the fast interrupt timer signal over data path 367, which in turn will cause the assertion of the fast interrupt signal 373. In alternative embodiments, there may be a plurality of timers for the fast interrupt signal as well as a plurality of timers for normal interrupt signals. The timer 383 includes at least one interrupt timer 384B which is used to store a time-related value to increment or decrement a time or time duration in order to cause the assertion of a normal interrupt signal by the interrupt controller 379. It can be seen from FIG. 9 that the interrupt controller 379 includes at least two ports to receive interrupts from two different sources. In particular, the interrupt controller 379 receives internal system interrupts 385 through one port and receives other interrupts from a general purpose 110 interrupt controller 381, which in turn is coupled to receive interrupts from the graphics processing unit (GPU interrupts 387) and interrupts from the power management unit (PMU interrupts 389) and all other input/output interrupts 391. It will be understood that the system 375 shown in FIG. 9 is a particular implementation of the system shown in FIG. 7.

Figure 8:
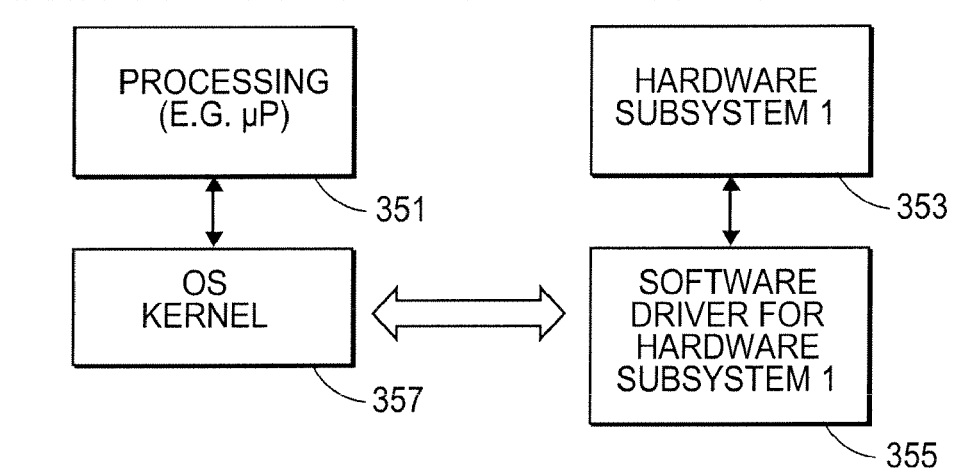
FIG. 8 shows a relationship between certain hardware components and certain software components in a data processing system according to one embodiment of the present inventions.

FIG. 8 illustrates the relationship which may exist in at least certain embodiments of a system such as that shown in FIG. 7 between the operating system software, such as an OS kernel 357, and a software driver for the hardware of subsystem 1 such as the driver 355. The operating system kernel software 375 may be considered to be in communication with the software driver 355 in a variety of different ways. For example, the software driver 355 may make calls to the operating system or to other software components and receive call backs or other acknowledgements from the operating system or other software components. In certain embodiments, the software driver may cause an interrupt signal to be generated for servicing through the interrupt controller of the system, such as the interrupt controller 307 of FIG. 7. These calls or interrupts may be generally considered to be messages between the software driver for a particular subsystem and the rest of the data processing system and may be used as part of the power management process in the process for scheduling of timed events such as the time-related events 323. For example, a software driver may provide a message to the operating system that the instruction queue of user tasks/threads for the hardware subsystem being controlled by the software driver is empty or contains only future scheduled events. This can allow the microprocessor to turn off that subsystem in response to the state of its instruction queue. It will be understood that a software driver for a particular subsystem may be part of a particular application process for that subsystem, such as application process 327. For example, a software driver for an MP3 decoder subsystem may be considered part of the application process 327. Similarly, a software driver for another hardware subsystem may be considered part of another application process, such as the application process 329 shown in FIG. 7. It will also be appreciated that the processing system, such as processing system 351, may exchange other types of messages to the hardware subsystem, such as hardware subsystem 253, and these messages may indicate that a hardware system needs to reduce power or increase power, as the case may be.

Figure 10:
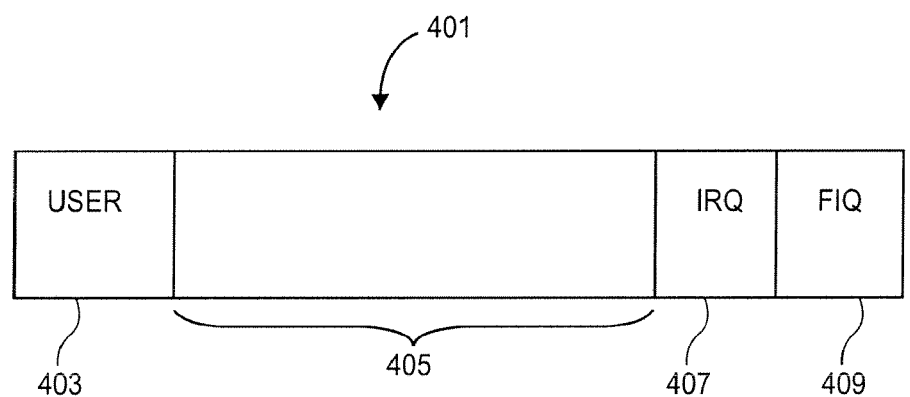
FIG. 10 shows an example of registers in a microprocessor according to one embodiment of the present inventions.

FIG. 10 shows an example of the registers of a microprocessor and how they are allocated among different resources for different operating modes of the microprocessor. Typically, the microprocessor will have multiple operating modes, such as regular interrupt mode, fast interrupt mode, user mode, etc. User registers, such as user register 403, are available for use by user application processes, and shared registers 405 are shared across modes of the microprocessor. The regular interrupt registers 407 are used to service regular interrupt signals, and the fast interrupt register 409 includes a private space which can be used to avoid saving user context and state when switching between user mode and fast interrupt mode. This feature can improve processing time of the fast interrupt signal relative to a normal interrupt signal and hence provides a higher priority of service to any process which causes the assertion of the fast interrupt signal.

Figure 12:
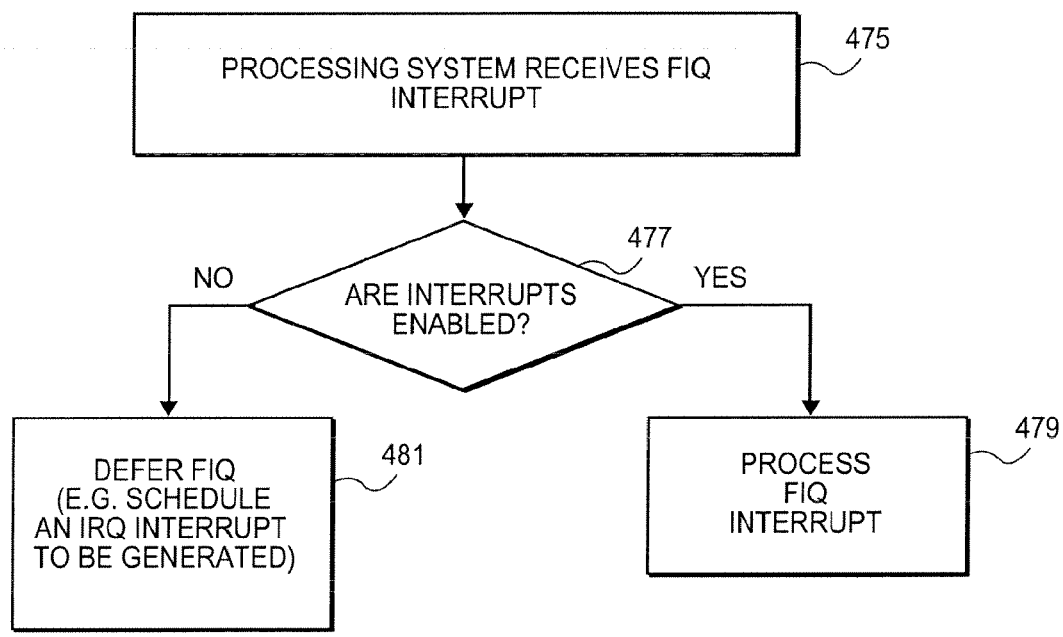
FIG. 12 is a flow chart which illustrates how fast interrupts may be processed if interrupts are disabled according to at least one embodiment of the present inventions.

FIG. 12 shows an example of how a data processing system, in at least one embodiment, will handle a fast interrupt signal, such as the fast interrupt signal asserted in operation 459 in FIG. 11 when interrupts are disabled. Operation 461 in FIG. 11 assumed that interrupts were enabled. If they are not enabled, at least one embodiment can perform the operation shown in FIG. 12. In operation 475, the processing system receives a fast interrupt and determines whether interrupts are enabled in operation 477. If they are enabled, then the interrupt is processed normally in operation 479, which is shown in further detail in operation 461 of FIG. 11. If interrupts are not enabled, then processing proceeds from operation 477 to operation 481 in which, in at least one embodiment, the fast interrupt signal is converted into a regular interrupt signal by scheduling a regular interrupt to be generated. This may include the saving of context and other information associated with the fast interrupt signal and the clearing of the fast interrupt status information in order to effectively remove the assertion of the fast interrupt signal and convert it into a regular interrupt. Once the interrupts are again enabled, the interrupt which resulted from the fast interrupt conversion in operation 481, may call the operating system kernel to handle a time-related event interrupt associated with the process which caused the assertion of the fast interrupt signal. In one embodiment, in the usual case when the FIQ occurs, the processor's mode will be converted from FIQ to IRQ and the RTC's (Real Time Clock) interrupt handler (rtclock_intr( )) will be called. If, when the FIQ occurs, interrupts are disabled, it is assumed that it is not safe to use the processor's IRQ mode. This could be because a client has disabled IRQ so that they are not interrupted or because there is already an IRQ in progress. In either case rtclock_intr should not be called. Instead, in one embodiment, cpu_signal( ) is called to request that an interrupt (IRQ) be generated by software. At some later time when IRQ is enabled, the interrupt from cpu_signal( ) will occur and control flow will pass to the kernel's inter-processor interrupt (IPI) handler. The IPI handler will note that a rtclock interrupt is pending and call rtclock_intr( ).

Figure 13:
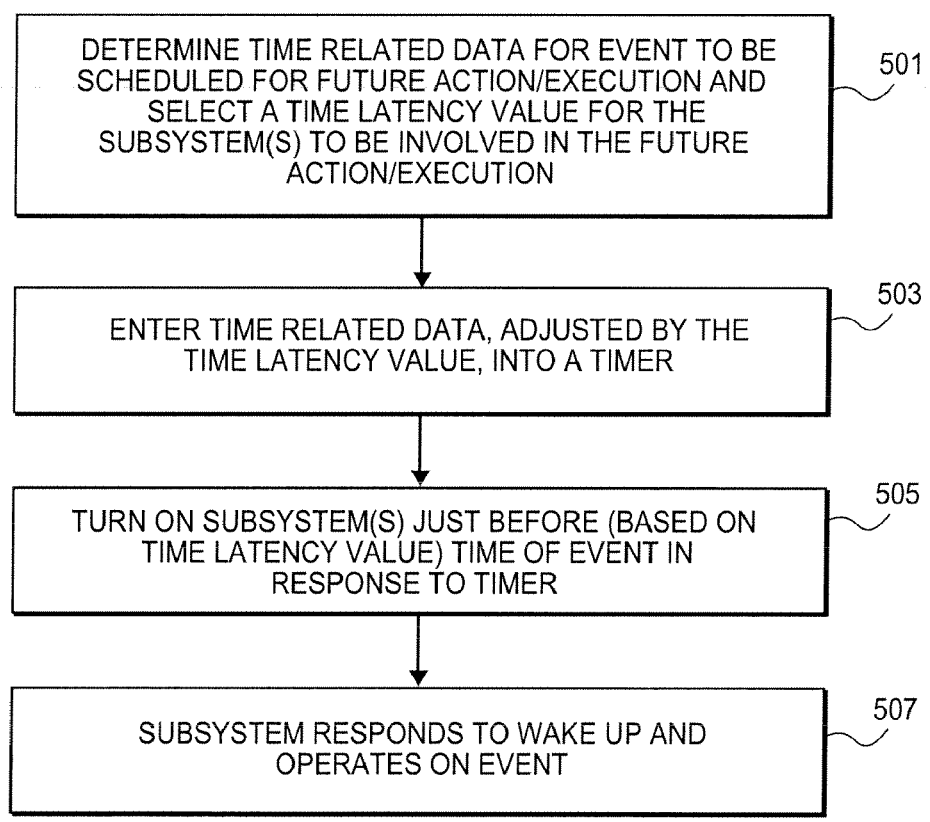
FIG. 13 is a flow chart which illustrates a method of the present inventions which adjusts for a latency in a subsystem.
Figure 14:
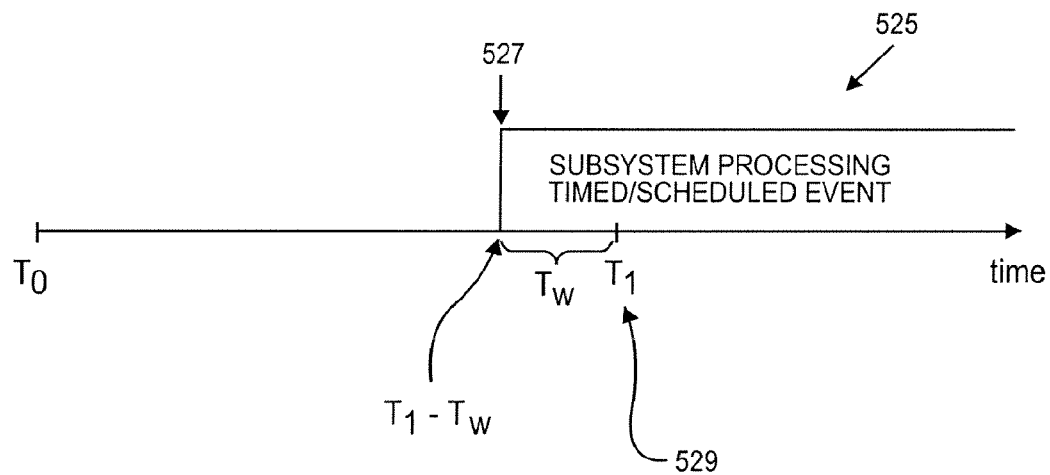
FIG. 14 is a time line which provides an example of the adjustment for the latency of a subsystem according to one embodiment of the present inventions.

FIGS. 13 and 14 relate to another aspect of the present inventions in which a data processing system may take into account the time it takes for a subsystem to start up from a reduced power state. In other words, a data processing system may take into account that there is some lag or latency between when full power is applied to a subsystem and when it is stabilized and ready to operate after having been powered up from a reduced power consumption state. It can be seen that embodiments of methods described relative to FIGS. 13 and 14 may be useful in methods such as that shown in FIGS. 5A and 5B in which subsystems are turned on and turned off over short periods of time. For example, operation 251 shown in FIG. 6 may involve a wake up operation for a microprocessor which has been in a reduced power state and now needs to process the timed event whose time has occurred. Similarly, the use of a latency value as described relative to FIGS. 13 and 14 may be used in operation 461 in which a processing system, or another subsystem of a data processing system, may be in a low power state as it exits that state and takes some time before it is ready to begin operating at full voltage or full power. From a user's perspective, the system appears to respond as if there were no latency because of the fact that the subsystem was started before the time of the scheduled event in order to give the subsystem time to get ready and be able to start processing at or near the scheduled time. In operation 501 of FIG. 13, the data processing system determines a time-related data for an event to be scheduled for a future action for execution and selects a time latency value for the subsystem or subsystems to be involved in the future action/execution. In one embodiment, the data processing system implementing the method of FIG. 13 may be the system shown in FIG. 4 and the microprocessor 173 may be scheduling a future event such as the decoding of MPEG data in an MPEG decoding subsystem. That decoding, relative to a current time, will determine a time to enter into a counter, such as a fast interrupt timer counter 384A which will cause the assertion of the fast interrupt signal in order to decode the next set of MPEG data. If the processor and/or the MPEG decoder subsystem are going to be off before the event occurs, then there may be some latency time involved in waking up the processor and/or the MPEG decoder subsection. Based on the latency of the particular subsystem, the processor will select a time latency value which may be a measured value or an estimated value of the subsystem (e.g., the subsystem with the most latency if there are two subsystems to wake up) and the time data which is entered into the timer may be adjusted in accordance with the selected time latency value so that the subsystem, such as the microprocessor or another subsystem, may be caused to exit a low power state and enter a higher power state (such as completely off to completely on as described herein). The timer, in the case of operation 503, may be a timer which will cause the assertion of a fast interrupt signal as in the embodiment shown in FIG. 7. The assertion of the fast interrupt signal or other interrupt signal may then cause the subsystem to be turned on in operation 505 just before the time of the event in response to the timer. Then in operation 507, the subsystem responds to the wake up process and operates on the event. FIG. 14 shows a time line which represents how the subsystem is started before the time of the scheduled event in order to give the subsystem an additional period of time to stabilize so that it is ready to actually operate on the instructions or perform operations at the scheduled time. In particular, the latency time is represented by the time Tw and the actual time of the scheduled event is T1 shown as time 529. The subsystem is turned on at time T1-Tw, which is labeled as time 527, which gives sufficient time for the subsystem to enter a higher power state and stabilize at that state and be ready for processing of instructions or operations at time T1. It will be appreciated that the latency time Tw may be estimated or measured and that the actual latency time used as the time latency value may be equal to or less than the actual or estimated latency time of a particular subsystem.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A data processing system, comprising:
a processing unit;
an interrupt controller coupled to the processing unit, wherein the interrupt controller is configured to transmit a first interrupt signal to the processing unit, the first-priority interrupt signal to cause at least the processing unit to be powered up from a reduced power state; and
a timer circuit coupled to the interrupt controller;
wherein the processing unit is configured to:
maintain a list, wherein the list includes a plurality of entries of time-related events for a plurality of application programs, wherein the plurality of entries include a respective scheduled time for each time-related event to be performed;
select an entry of the plurality of entries of the list for a given one of the time-related events;
determine a time latency value for the processing unit to power up from a reduced power state;
determine a wake up time for the given one of the time-related events dependent upon the determined time latency value and the respective scheduled time included in the selected entry of the plurality of entries;
store a value into the timer circuit, the value representing the determined wake up time for the time-related event to be performed; and
enter the reduced power state;
wherein the timer circuit is configured to initiate an assertion of the first-priority interrupt signal for the time-related event to be performed as scheduled in response to reaching the determined wake up time while the processing unit is in the reduced power state; and
wherein the processing unit is further configured to:
power up from the reduced power state in response to the assertion of the first interrupt signal; and
execute an application program corresponding to the selected entry for the given one of the time-related events.

2. The data processing system of claim 1 where in the interrupt controller is further configured to transmit a second interrupt signal, and wherein the first interrupt signal is a fast interrupt signal and the second interrupt signal is a normal interrupt signal.

3. The data processing system of claim 1 wherein the plurality of application programs execute concurrently and wherein each application program of the plurality of application programs comprises a software process executed by a respective one of a plurality of hardware subsystems.

4. The data processing system of claim 3 wherein at least one hardware subsystem of the plurality of hardware subsystems includes one of (a) a data codec; (b) a digital signal processor; (c) the processing unit; (d) a graphics processing unit; (e) a display controller; (f) a wireless interface controller; (g) a camera interface controller; and (h) a serial bus interface controller.

5. The data processing system of claim 1 wherein the processing unit, the interrupt controller and the timer circuit are disposed on a monolithic semiconductor substrate which is a system on a chip (SOC), and wherein a graphics processing unit, at least one peripheral interface controller, at least one memory controller, and at least one codec are also disposed on the monolithic semiconductor substrate, and wherein the processing unit comprises a microprocessor.

6. The data processing system of claim 1 wherein the time-related event comprises an event which represents an action to be performed at or after the scheduled time.

7. The data processing system of claim 2 wherein the first interrupt signal is converted to the second interrupt signal dependent upon a determination that interrupts are disabled when the first interrupt signal is asserted.

8. The data processing system of claim 1 wherein to power up from the reduced power state responsive to the assertion of the first interrupt signal, the processing unit is further configured to power up without executing operating system software.

9. A data processing system comprising:
a plurality of hardware subsystems, wherein at least one of the plurality of hardware subsystems includes a processing unit;
an interrupt controller coupled to the plurality of hardware subsystems, wherein the interrupt controller is configured to provide a first interrupt signal; and
a timing circuit coupled to the interrupt controller;
wherein the processing unit is configured to:
maintain a list, wherein the list includes a plurality of entries of time-related events for a plurality of application programs, wherein the plurality of entries include a respective scheduled time for each time-related events to be performed;
select an entry of the plurality of entries of the list for a given one of the time-related events;
determine a time latency value for two or more hardware subsystems of the plurality of hardware subsystems to power up from a reduced power state;
determine a wake up time for the given one of the time-related events dependent upon the determined time latency value and the respective scheduled time included in the selected entry for the given one of the time-related events;
store the wake up time in the timer circuit;
enter the reduced power state;
wherein the timing circuit is configured to initiate an assertion of the first interrupt signal for the time-related event to be performed as scheduled in response to reaching the determined wake up time;
wherein the processing unit is further configured to exit the reduced power state based on the assertion of the first interrupt signal; and
wherein, in response to the processing unit exiting the reduced power state, at least a first one of the plurality of application programs is executed by the processing unit and at least a second one of the plurality of application programs is executed by at least one additional hardware subsystem of the plurality of hardware subsystems.

10. The data processing system of claim 9 wherein the plurality of application programs execute concurrently and wherein each application program of the plurality of application programs comprises a software process executed by a respective one of the plurality of hardware subsystems, wherein at least one additional hardware subsystem of the plurality of hardware subsystems includes one of (a) a data codec; (b) a digital signal processor; (c) another processing unit; (d) a graphics processing unit; (e) a display controller; (f) a wireless interface controller; (g) a camera interface controller; and (h) a serial bus interface controller.

11. The data processing system of claim 9 wherein to exit from the reduced power state responsive to the first interrupt signal, the processing unit is further configured to exit from the reduced power state without executing operating system software.

12. The method of claim 9 wherein the wake up time is represented by one of a period of time or a point in time.

13. The data processing system of claim 9 wherein to determine the time latency value for one or more hardware subsystems of the plurality of hardware subsystems, the processing unit is further configured to select a longest latency associated with the two or more hardware subsystems of the plurality of hardware subsystems.

14. A machine implemented method comprising:
maintaining a list, wherein the list includes a plurality of entries, wherein each entry of the plurality of entries includes scheduling information for a respective one of a plurality of application programs wherein the plurality of application programs execute on a plurality of different hardware subsystems including a first processor and a second processor;
selecting an entry of the plurality of entries of the list for a given one of the plurality of application programs;
determining a time latency value indicative of the time required for the first processor and the second processor to exit from a reduced power state;
determining a wake up time for the given one of the plurality of application programs dependent upon the determined time latency value and the scheduling information included in the selected entry of the plurality of entries;
storing the wake up time in a timing circuit;
entering the reduced power state by the first processor and the second processor;
asserting a first interrupt signal in response to the wake up time occurring, wherein the timing circuit initiates the assertion of the first interrupt signal by an interrupt controller; and
exiting, by the first processor and the second processor, from the reduced power state responsive to the first interrupt signal;
executing, by the first processor, at least a first one of the plurality of application programs responsive to the first processor exiting from the reduced power state; and
executing, by the second processor, at least a second one of the plurality of application programs responsive to the second processor exiting from the reduced power state.

15. The method of claim 14 wherein the wake up time is represented by one of a period of time or a point in time.

16. The method of claim 15 wherein determining the time latency value further comprises selecting a longest latency between the latency for the first processor to exit from the reduced power state and the latency for the second processor to exit from the reduced power state.

17. The method of claim 15 wherein the plurality of application programs execute concurrently and wherein each application program of the plurality of application programs comprises a software process executed by a respective one of a plurality of hardware subsystems.

18. The method of claim 17 wherein at least one hardware subsystem of the plurality of hardware subsystems includes one of (a) a data codec; (b) a digital signal processor; (c) a processing unit; (d) a graphics processing unit; (e) a display controller; (f) a wireless interface controller; (g) a camera interface controller; and (h) a serial bus interface controller.

19. A computer-readable storage medium storing executable program instructions which when executed by a computer system, cause the computer system to perform a method comprising:
maintaining a list, wherein the list includes a plurality of entries, wherein each entry of the plurality of entries includes scheduling information for a respective one of a plurality of application programs wherein the plurality of application programs execute on a plurality of different hardware subsystems including a first processor and a second processor;
selecting an entry of the plurality of entries of the list for a given one of the plurality of application programs;
determining a time latency value indicative of the time required for the first processor and the second processor to exit from a reduced power state;
determining a wake up time for the given one of the plurality of application programs dependent upon the determined time latency value and the scheduling information included in the selected entry of the plurality of entries;
storing the wake up time in a timing circuit;
entering a reduced power state by the first processor;
entering a reduced power state by the second processor;
asserting a first interrupt signal in response to the wake up time occurring, wherein the timing circuit initiates the assertion of the first interrupt signal by an interrupt controller;
exiting, by the first processor, from the reduced power state responsive to the assertion of the first interrupt signal;
exiting, by the second processor, from the reduced power state responsive to the assertion of the first interrupt signal;
executing, by the first processor, at least a first one of the plurality of application programs responsive to the first processor exiting from the reduced power state; and
executing, by the second processor, at least a second one of the plurality of application programs responsive to the second processor exiting from the reduced power state.

20. The medium of claim 19 wherein the wake up time is represented by one of a period of time or a point in time.

21. The medium of claim 20, further comprising asserting a second interrupt signal, and assigning a lower priority service to the second interrupt signal.

22. The medium of claim 20 wherein the plurality of application programs execute concurrently and wherein each application program of the plurality of application programs comprises a software process executed by a respective one of a plurality of hardware subsystems, wherein at least one hardware subsystem of the plurality of hardware subsystems includes one of (a) a data codec; (b) a digital signal processor; (c) a processing unit; (d) a graphics processing unit; (e) a display controller; (f) a wireless interface controller; (g) a camera interface controller; and (h) a serial bus interface controller.

23. The medium of claim 19, wherein determining the time latency value further comprises selecting a longest latency between the latency for the first processor to exit from the reduced power state and the latency for the second processor to exit from the reduced power state.

24. A data processing system comprising:
means for maintaining a list, wherein the list includes a plurality of entries, wherein each entry of the plurality of entries includes scheduling information for a respective one of a plurality of application programs wherein the plurality of application programs execute on a plurality of different hardware subsystems including a first processor and a second processor, wherein the means for selecting includes the first processor;
means for selecting an entry of the plurality of entries of the list for a given one of the plurality of application programs;

means for determining a time latency value indicative of the time required for the first processor and the second processor to exit from a reduced power state;

means for determining a wake up time for the given one of the plurality of application programs dependent upon the determined time latency value and the scheduling information included in the selected entry of the plurality of entries;

means for storing the wake up time in a timing circuit, coupled to the means for determining, in response to the determining, wherein the means for storing includes the first processor;

means for entering a reduced power state, wherein the means for entering includes the first processor, and wherein the reduced power state includes a zero voltage state means for entering a reduced power state, wherein the means for entering includes the second processor, and wherein the reduced power state includes a zero voltage state means for asserting a first interrupt signal, coupled to the means for storing, in response to the wake up time occurring, wherein the timing circuit initiates the assertion of the first interrupt signal by an interrupt controller;

means for exiting from the reduced power state in response to the first interrupt signal wherein the means for exiting includes the first processor;

means for exiting from the reduced power state in response to the first interrupt signal wherein the means for exiting includes the second processor;

means for executing at least one of the plurality of application programs, wherein the means for executing includes the first processor; and means for executing at least a second one of the plurality of application programs, wherein the means for executing includes the second processor.

* * * * *